No. 720,991. PATENTED FEB. 17, 1903.
A. L. ADAMS.
PHOTOGRAPHIC ROLLER BLIND SHUTTER.
APPLICATION FILED OCT. 6, 1902.
NO MODEL. 2 SHEETS—SHEET 1.
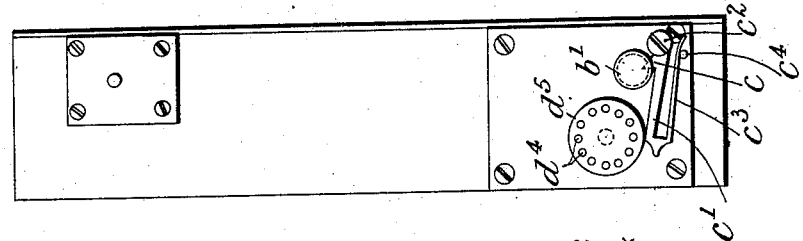
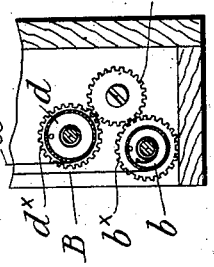
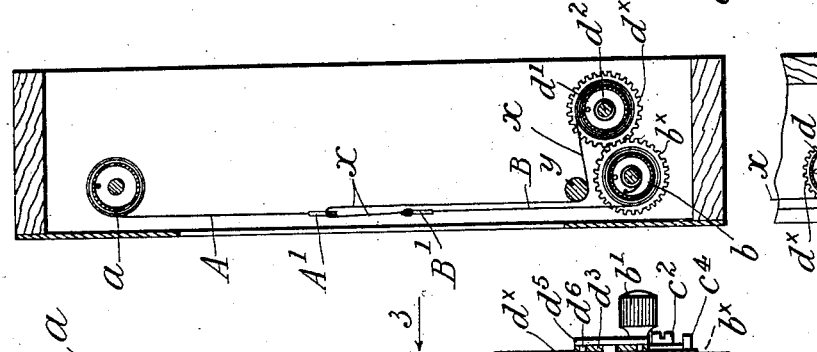
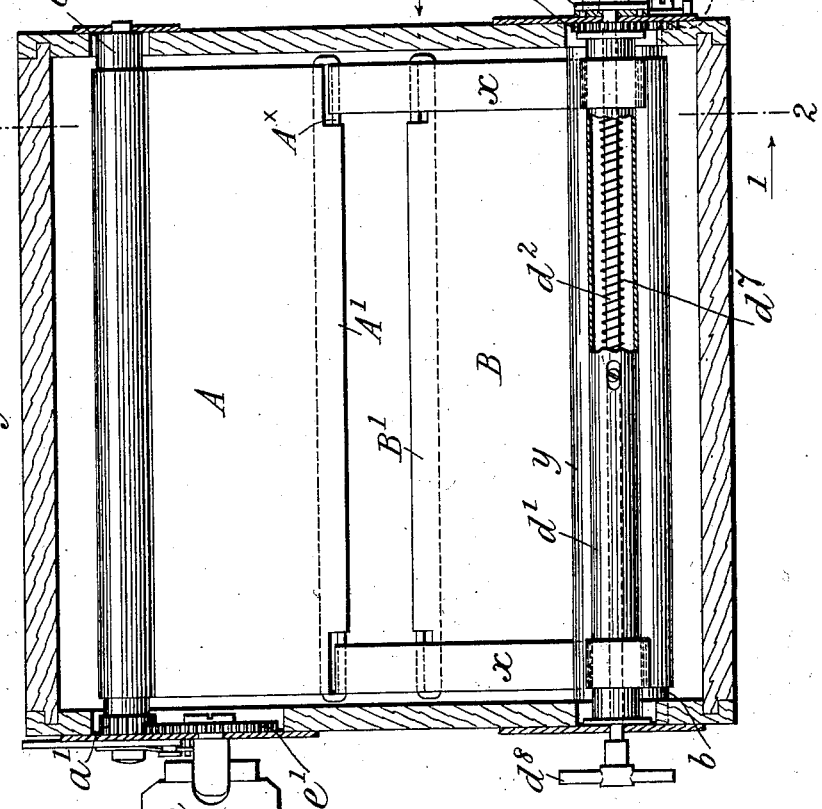
Witnesses.
Inventor.
A. L. Adams.
by Wilkinson + Fisher
Attorneys.

No. 720,991. PATENTED FEB. 17, 1903.
A. L. ADAMS.
PHOTOGRAPHIC ROLLER BLIND SHUTTER.
APPLICATION FILED OCT. 6, 1902.
NO MODEL. 2 SHEETS—SHEET 2.
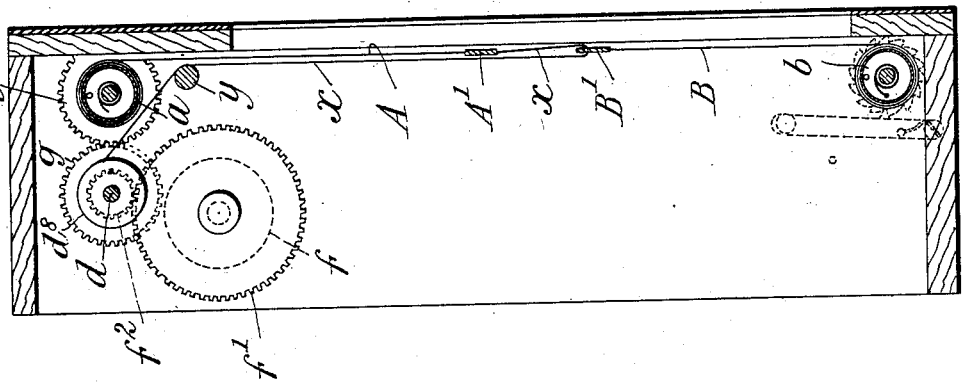
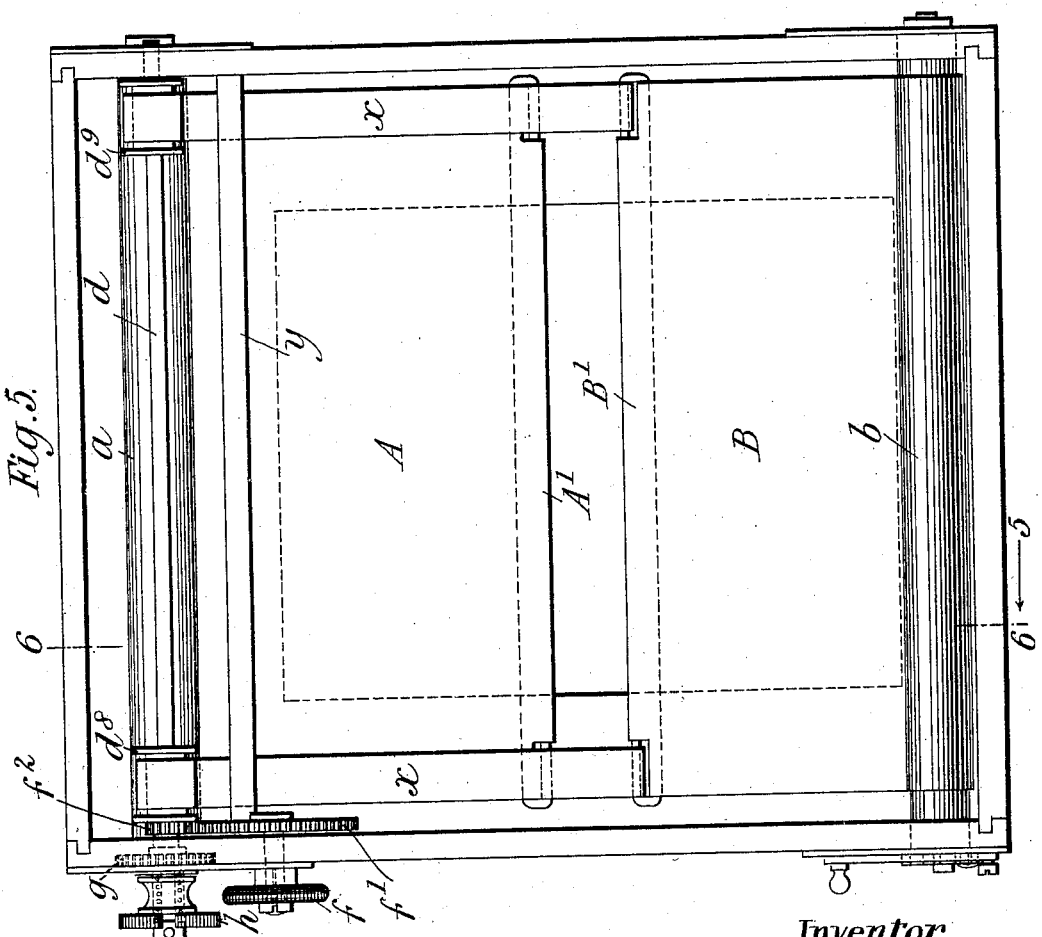
Witnesses.
Inventor.
A. L. Adams.
by Wilkinson & Fisher
Attorneys.

UNITED STATES PATENT OFFICE.

ARTHUR LEWIS ADAMS, OF LONDON, ENGLAND.

PHOTOGRAPHIC ROLLER-BLIND SHUTTER.

SPECIFICATION forming part of Letters Patent No. 720,991, dated February 17, 1903.

Application filed October 6, 1902. Serial No. 126,240. (No model.)

*To all whom it may concern:*

Be it known that I, ARTHUR LEWIS ADAMS, manufacturer of photographic apparatus, a subject of the King of Great Britain, residing at 26 Charing Cross road, London, England, have invented certain new and useful Improvements in or Relating to Photographic Roller-Blind Shutters, of which the following is a specification.

This invention relates to focal-plane or other roller-blind shutters for photographic purposes of the character in which the size of the aperture or slot in the blind can, when desired, be adjusted (increased or diminished) from the exterior of the camera or shutter case—that is, without having to obtain access to the interior of said shutter or camera fitted therewith, as heretofore.

My present invention comprises a photographic roller-blind shutter in which the blind employed is in two parts, one such blind part being attached to a roller to one side of the aperture through which the exposure is to be given, the other blind part being attached to a spring-actuated roller at the opposite side of said aperture and parallel to the first-named roller, adjusting-tapes or flexible connections connecting the free ends of said two blind parts at varying distances apart by passing one end of said tapes or flexible connections freely through one blind part and attaching same to the free end of the other blind part, while the opposite ends of said tapes or flexible connections are attached to a third roller located proximate to and detachably geared to either of the aforesaid blind-rollers, so that such tape-regulating roller and its proximate blind-roller, to which it is geared, as aforesaid, normally revolve together, and means to temporarily place said tape-roller out of gear with its proximate blind-roller, and means to revolve said tape-roller when so detached independently of its proximate blind-roller, or vice versa, and means to retain the said spring blind-roller when the shutter is set, and comprising other features and details, as fully described hereinafter and finally pointed out in the claims.

Referring to the accompanying drawings, Figure 1 is front view in elevation, partly in section, of a roller-blind shutter embodying my present invention. Fig. 2 is a vertical cross-sectional view on line 2 2, Fig. 1, looking in the direction of the arrow 1. Fig. 3 is an end view in elevation looking in the direction of the arrow 3, Fig. 1. Fig. 4 is a local view of a slightly-modified arrangement, as hereinafter described. Fig. 5 is front view in elevation showing another modification; and Fig. 6 is a vertical cross-sectional view on line 6 6, Fig. 5, looking in the direction of the arrow 5, Fig. 5.

Referring to Figs. 1 to 3, the roller-blind, of any suitable flexible light-tight material, is formed in two parts A and B, as shown in the drawings, of the same or different lengths, one end of the part A being attached to and adapted to be wound on a roller $a$, located to one side of the aperture across which the blind is drawn or to be drawn, one end of the other part B being attached to and adapted to be wound on a spring-roller $b$, located on the opposite side of said aperture and parallel to the roller $a$. This roller $b$ is provided with any suitable motor, (not shown,) such as a coiled or other suitable spring, in the interior of or exterior of said roller $b$, the strength of such spring or motor being adapted to be regulated by any suitable means—such, for instance, as the milled head $b'$—on the exterior of the shutter-case and the spring-pawl $c$ on the arm $c'$, pivoted at $c^2$ and provided with a spring $c^3$, acting against the fixed pin $c^4$, whereby the tension of the spring in the roller $b$ can be increased by rotating said milled head $b'$, or reduced when desired by disengaging the spring-catch $c\ c'$ and releasing the spring acting on the roller $b$.

By the side of and parallel to the roller $b$ is a roller $d$ for adjusting the width of the aperture between the blind parts A and B, this roller $d$ consisting of an outer part $d'$ and an inner shaft $d^2$.

The outer roller $d'$ is geared at one or both of its ends by the toothed wheels $b^\times\ d^\times$ to the roller $b$. The inner shaft $d^2$ is adapted to be detached from the outer part or outer roller $d'$ by means adapted to be operated from the exterior of the camera or shutter case. For instance, this may be accomplished in the manner illustrated by way of example in the drawings, namely:

The outer roller $d'$ besides having the gear-wheel $d^\times$ attached thereto has also affixed thereto the disk $d^3$, provided with a concentric ring of pin-holes $d^4$ therein. The inner shaft $d^2$ has fixed on the outer end thereof the disk $d^5$, which latter is provided with the inwardly-projecting pin or crank-pin $d^6$, adapted to lock or engage with any of the holes $d^4$ in the disk $d^3$ and normally kept pressed into engagement therewith by means of the spring $d^7$ on the inner shaft $d^2$, which spring $d^7$ tends to keep the inner shaft $d^2$ normally pressed in the direction of the arrow 3.

The inner shaft $d^2$ is capable of slight longitudinal movement through and with respect to the outer roller $d'$, or vice versa, and any suitable means may be provided for imparting said longitudinal movement to the inner shaft $d^2$ and for rotating the latter, together with the outer roller $d'$, when the complete roller $d$ is disengaged from the blind roller $b$. For instance, a knob or handle, such as $d^8$, may be fixed on the end of the shaft $d^2$, so that when such roller $d$ has been disconnected from the roller $b$—namely, by means of the inner shaft $d^2$ disconnecting the roller $d$ from the gear-wheel $d^\times$—thereby the roller $d$ can then from the exterior of the camera be made to rotate, as desired, independently of the roller $b$. To this roller one end of each of the tapes $x$ is attached, and from this roller $d$ each tape $x$ after passing around a guide-roller $y$, Fig. 2, passes up to and freely through the eye or slot $A^\times$, provided, if desired, with an antifriction-roller or the like, in the edge $A'$ of the blind part A, and thence each said tape $x$ is led to and permanently attached to the edge $B'$ of the blind part B. Thus it will readily be seen that when the roller $d$ has been, by the gear-wheel $d^\times$, geared to the roller $b$ consequently the distance between the edges $A'$ and $B'$ of the two blind parts A and B become fixed. To alter the width of the shutter-slit—that is, to alter the distance apart of the edges $A'$ and $B'$—the inner shaft $d^2$ has to be moved longitudinally through the outer part $d'$ of the roller $d$, so as to permit this roller $d$ to be rotated independently of the roller $b$, and thereby the tapes $x$ may be wound on or wound off said roller $d$, and thus diminish or increase the width of shutter-slit to the desired degree, whereupon the rollers $d$ and $b$ are geared together again, and such width of shutter-slit will then be maintained until again adjusted, and so on. It will thus be seen that no tapes or flexible connections from the roller $a$ are used.

After the width of the shutter has been adjusted, as aforesaid, to the desired extent the shutter may be set in the usual manner of setting such shutters or in any suitable manner. For instance, the roller $a$ may be revolved by means of the winding-key $e$, fixed to the gear-wheel $e'$, gearing with the toothed wheel $a'$ on the roller $a$ until the blind part A, attached to it, is wound upon it and as much of the connections or tapes $x$ between the two blind parts A and B as is necessary, any suitable catch being provided to retain the shutter in position when thus set.

The shutter is released by any suitable releasing-catch or releasing device.

When the shutter is released, the width of aperture will be maintained or sufficiently maintained as the blind is drawn across to give the exposure.

The shutter, as above described, is arranged with the winding-roller $a$ at the top and the spring-roller $b$ and adjusting-roller $d$ at the bottom of the case; but it can be arranged vice versa or right to left or left to right—i. e., sidewise—if desired.

In Fig. 4 is shown a slight modification of the arrangement shown in Fig. 2—namely, the roller $d$ is arranged above and nearly vertically over the roller $b$ and instead of toothed wheels $b^\times$ and $d^\times$ on said rollers $b$ and $d$ gearing with one another direct, as in Figs. 1 and 2, an intermediate toothed wheel $b^{\times\times}$ is introduced, which gears with said toothed wheels $d^\times$ and $b^\times$, so that the rollers $b$ and $d$ are rotated in the same direction.

Instead of arranging the rollers as shown in Figs. 1 and 2 I may carry my present invention into practice, as hereinafter described with reference to Figs. 5 and 6 of the drawings hereunto annexed.

Referring to Figs. 5 and 6, the upper blind part A is attached to a top roller $a$, and a parallel spring-roller $b$ is arranged at the bottom, to which is attached the lower blind part B, the upper blind part A being wound upon the top roller $a$ when the shutter is set and may or may not be partly wound upon the bottom roller $b$ when the shutter has been released, after having been set or wound up. The third roller $d$ is placed at the top adjacent to the top roller $a$ instead of being placed at the bottom near the roller $b$, as in Figs. 1 and 2, and I place in or attach to one or both of these top rollers $a$ or $d$ a motor or coiled spring—for instance, in the arrangement illustrated, as the roller $d$ consists only of a solid shaft $d$ with drums $d^9$ on the ends thereof for winding the tapes on the latter. Therefore the motor is in this case arranged in the roller $a$, or I may, if preferred, place the motor in or upon the roller $d$; but in either case the bottom roller $b$ must contain a more powerful motor or spring than either of the top rollers $a$ or $d$, jointly or combined, in this arrangement.

The two rollers $a$ and $d$ are geared together and are adapted to be disconnected in the same or similar or equivalent manner to that described with reference to rollers $b$ and $d$ in Figs. 1 to 3. The tapes or connections $x$, which are attached at one end to the drums $d^9$, carried on the roller $d$, or otherwise suitably attached to the roller $d$, are led from the latter over the guiding-roller $y$ down to and pass freely through eyes or pulleys or equivalent in or on the top edge $B'$ of the lower blind part B and from the latter pass up to and are permanently attached to the lower edge A' of the upper blind part A.

The shutter may be set by winding the top rollers up by any suitable means, such as the milled head $f$, Fig. 5, attached to the large gear-wheel $f'$, gearing with a small gear-wheel $f^2$ on the roller $d$, which latter also carries thereon the gear-wheel $g$, which in turn gears with the gear-wheel $g'$, attached to the roller $a$, so that by rotating the milled head $f$ thereby the two rollers $a$ and $d$ are simultaneously and correspondingly revolved, while by disconnecting the gear-wheels $g$ and $g'$, which can be done by sliding the nut with milled head $h$ along the shaft $d$ toward the fixed head $d^{10}$ on the shaft $d$, thereby the tapes $x$ can be let out or taken up—i. e., wound off or wound on the drums $d^9$—and thereby the width of the slit between the edges A' and B' can be varied as desired, and thereupon the toothed wheels $g$ and $g'$ are placed in gear again and the blind is set and operated with such width of slit until it is again desired to adjust and alter same. Having "set" the shutter—i. e., wound the shutter ready for giving an exposure—by winding the top rollers, as aforesaid, or by unwinding the bottom roller $b$ by turning the latter direct from the outside or by any system of gearing, the same is held and retained in the set position by any suitable catch and released by any suitable means, as aforesaid.

When the shutter is set, by rotating the lower roller $b$ from the outside, as aforesaid, the spring in either or both of the top rollers $a\ d$ will be sufficient to wind thereon the upper blind part A and tapes, &c., and to raise the bottom blind part B, and in order to prevent the stronger spring—i. e., in the bottom roller—overcoming the weaker spring or springs in either or both of the top rollers $a$ and $d$ I may employ a ratchet-wheel thereon or its equivalent or provide a catch, as is at present done with the top or driven roller of existing shutters. Thus when the shutter is set by revolving the roller $b$ as far as it can be revolved the blind part B, attached to it, will be drawn fully across the aperture between the top and bottom rollers and will remain there as long as the pawl or catch is in the ratchet-wheel or its equivalent. Either of the top rollers $a$ and $d$ can then be rotated, as hereinbefore described, for adjusting the width of the slit, and the shutter may be released in any suitable manner.

I may set or wind the shutter from the top instead of the bottom, if desired.

The operation with the arrangement shown in Figs. 5 and 6 is as follows: The shutter is first set as aforesaid, and then the width of slit or aperture between the blind parts A and B can be varied as desired. If the bottom roller $b$ and its blind part B were not secured after having drawn it across the aperture between the bottom and the top rollers, it would tend to run back again and would alter its position according to the width of the slit and as the latter was altered, and this would make it necessary to rewind or reset the shutter after the width of slit has been adjusted, and, furthermore, the speed-indicator could not be so suitably arranged. It would also limit the extent to which the width of the slit can be varied after the blind had been set, because the tape could not freely pass through the eye or pulley when the free edge B' of the bottom blind part B began to revolve around its roller $b$. My present invention overcomes these disadvantages and permits me to make a more useful shutter than heretofore.

I may employ any suitable means (not shown) for preventing the overwinding of any of the rollers when and where necessary. For instance, when the blind part B has been wound off the roller $b$ I may prevent any further rotation of the roller $b$ than is necessary, and for this purpose there may be employed on or in connection with said roller $b$ a snail action or screw-thread, or a spiral may be arranged at one or more ends of any of the rollers, while a pin or fixed stop is provided against which same will come when the blind part B has been sufficiently unwound, or a flat spring or other spring-arm may be mounted on the roller $b$ in such position and in such wise that when the blind part B is wound upon its roller $b$ such blind part will thereupon press the spring or spring-arm out of the way of a fixed stop (not shown) on the frame, and thus permit the roller $b$ to freely rotate in either direction, while such spring or spring-arm remains compressed under the blind part B, while upon winding the latter off its roller $b$ it will ultimately release said spring or spring-arm, and thereupon the latter will spring out into position to engage with any suitable pin or stop interposed in its path of travel when thus released, and thereby prevent further rotation of the roller $b$.

To prevent any more variation of width of slit than is required or permissible during the travel of the shutter when making the exposure, I may vary the thickness of one of the blind parts, or the tapes or connections $x$ may be thicker in some parts than in others and at whichever parts thereof that are necessary for effecting my purpose.

Any suitable means may be employed to indicate the size of the slit or the speed at which the shutter has been set. For instance, I may put markings on the tapes, visible through non-actinic colored glass, or I may employ an indicator operated by one or other of the rollers $a$ or $b$ or $d$. For instance, a small toothed wheel at the end of one of the rollers may engage with a larger toothed wheel provided with suitable markings adapted to be seen from the exterior of the case, or this last-named wheel may carry an arm or index-finger or pointer moving over any suitable scale or index adjacent thereto; also, if desired, means may be provided to adjust the strength of the spring or springs in the spring-roller. For instance, either the arrangement shown in Figs. 1 to 3 or any other suitable means may be provided for adjusting the spring or spring-motor which operates the roller b, so as to thereby vary the speed of the shutter.

If desired, this invention can be carried out in a camera or, as illustrated in the drawings, in a separate shutter or shutter-case, and by this latter arrangement the various rollers can be mounted quite close to the aperture or opening across which the blind is to be drawn to give the exposure.

The following advantages are obtained by roller-blind shutters arranged and constructed as hereinbefore set forth, according to the present invention, viz:

(a) Same avoids the necessity of closing the lens or covering up the sensitive surface in the camera in the event of its being desired to regulate—i. e., alter—the width of slit after the sensitive surface has been uncovered in the camera ready for giving the exposure.

(b) Same avoids the necessity of winding the blind to mid-position (as heretofore necessary) to enable regulation to be effected.

(c) Same avoids the necessity of second winding to finally set or reset the shutter, as heretofore necessary, after regulation has been effected.

(d) Same enables great width of slit to be obtained, the extreme width of slit in said shutters as hitherto constructed being limited to about the extent of the exposure-aperture, whereas greater width can be obtained by the present invention, thus enabling greater range of speeds to be obtained.

(e) The arrangement with the tape-roller at the top has the further advantage that it enables the size of slit to be regulated after the shutter has been set and without requiring any resetting after regulation.

Having now described my invention, what I claim as new, and desire to secure by Letters Patent of the United States, is—

1. In a focal-plane shutter, the combination with the top and bottom blind-rollers and separate blinds carried thereby, one of said rollers being spring-actuated; of an exposure-regulating roller adjacent said spring-actuated blind-roller; tapes adjustably connecting the free ends of said blinds and secured to said regulating-roller; means for normally rotating said regulating-roller and its adjacent blind-roller in opposite directions; means for independently rotating said regulating-roller and coöperating with said spring-actuated blind-roller and tapes for rotating said regulating-roller and its adjacent blind-roller in the same direction for adjusting the space between the ends of said blinds; and setting and releasing mechanism.

2. In a focal-plane shutter, the combination with the top and bottom blind-rollers and separate blinds carried thereby, one of said blind-rollers being spring-actuated; of an exposure-regulating roller adjacent said spring-actuated blind-roller; tapes adjustably connecting the free ends of said blinds and secured to said regulating-roller; means for normally rotating said regulating-roller and its adjacent blind-roller in opposite directions, comprising a fixed gear-wheel on said adjacent blind-roller and a detachably-secured gear-wheel on said regulating-roller meshing with said first gear-wheel; means for disengaging said detachable gear-wheel and said regulating-roller, for independently rotating said regulating-roller, and coöperating with said spring-actuated blind-roller and tapes for rotating said regulating-roller and its adjacent blind-roller in the same direction; and setting and releasing mechanism.

3. In a focal-plane shutter, the combination with the top and bottom blind-rollers and separate blinds carried thereby; of an exposure-regulating roller mounted adjacent one of said blind-rollers and geared thereto for normally rotating said regulating-roller and its adjacent blind-roller in opposite directions; flexible means connecting the free ends of said blinds and secured to said regulating-roller; means for winding said blinds under spring tension; means for locking and releasing same; and means connected to said regulating-roller and coöperating with said spring-tension means, and tapes for rotating said regulating-roller and its adjacent blind-roller in the same direction, independent of said other blind-roller, for regulating the space between the free ends of said blinds.

4. In a focal-plane shutter, the combination with the top and bottom blind-rollers and separate blinds carried thereby, one of said blind-rollers being spring-actuated; of an exposure-regulating roller adjacent said spring-actuated blind-roller; flexible means connecting the free ends of said blinds and secured to said regulating-roller; means for winding said blinds under spring tension; means for locking and releasing same; detachable gearing between said regulating-roller and its adjacent spring-actuated blind-roller for normally rotating same in opposite directions; and means connected to said regulating-roller for disengaging same from said spring-actuated blind-roller and coöperating therewith and with said flexible means, for rotating said regulating-roller and its adjacent blind-roller in the same direction.

5. In a focal-plane shutter, the combination with the top and bottom blind-rollers and separate blinds carried thereby, provided at their free ends with stiffening-plates having slots therethrough, one of said blind-rollers being spring-actuated; of an exposure-regulating roller adjacent said spring-actuated blind-roller; flexible means secured to both sides of the free end of the blind of said spring-actuated roller, reeving through the slots in the free end of said other blind and secured at their free ends to said regulating-roller.

6. In a focal-plane shutter, the combination with a suitable support provided with an exposure-opening; of parallel blind-rollers located above and below said exposure-opening, carrying separate blinds thereon; an exposure-regulating roller adjacent one of said blind-rollers and normally in gear therewith for rotating said rollers in opposite directions; tapes adjustably connecting the free ends of said blinds and secured to said regulating-roller; means for throwing said regulating-roller and its adjacent blind-roller out of gear and independently rotating said regulating-roller to wind or unwind said tapes; means coöperating with said tapes for rotating said adjacent blind-roller in the same direction of rotation as said regulating-roller when detached therefrom for correspondingly winding or unwinding the blind thereon; a spring operating one of said blind-rollers; means for retaining said spring blind-roller when the shutter is set; and means for releasing the shutter.

7. In a focal-plane shutter, the combination with a suitable support provided with an exposure-opening; of parallel blind-rollers located above and below said exposure-opening, carrying separate blinds thereon; an exposure-regulating roller adjacent one of said blind-rollers and normally in gear therewith for rotating said rollers in opposite directions; tapes adjustably connecting the free ends of said blinds and secured to said regulating-roller; means for throwing said regulating-roller and its adjacent blind-roller out of gear and independently rotating said regulating-roller to wind or unwind said tapes; means coöperating with said tapes for rotating said adjacent blind-roller in the same direction of rotation as said regulating-roller when detached therefrom for correspondingly winding or unwinding the blind thereon; a spring-motor actuating said regulating-roller; a spring-motor actuating one of said blind-rollers of sufficient strength to overcome the spring-actuated regulating-roller; and setting and releasing mechanism.

8. In a focal-plane shutter, the combination with a suitable support and an exposure-opening; of the top and bottom blind-rollers journaled therein and provided with separate blinds; adjustable flexible connections between the free ends of said blinds; means for drawing and retaining said lower blind in front of said exposure-opening for setting the shutter; means coöperating with said flexible connections for adjusting the space between the free ends of said blinds while said shutter is set and said lower blind held stationary before the exposure-opening; and means for releasing said shutter.

9. In a focal-plane shutter, the combination with the top and bottom blind-rollers and separate blinds carried thereby; of an exposure-regulating roller adjacent said top blind-roller; tapes adjustably connecting the free ends of said blinds and secured to said regulating-roller; means for normally rotating said regulating-roller and top blind-roller in opposite directions; means coöperating with said tapes for rotating said regulating-roller and top blind-roller in the same direction for adjusting the space between the free ends of said blinds; and setting and releasing mechanism.

10. In focal-plane or other roller-blind shutters for photographic purposes having the blind in two parts and a spring-actuated roller below the exposure-aperture and adapted to wind one part of the blind thereon and a parallel roller above the said aperture adapted to wind the other part of the blind thereon—the arrangement and combination therewith of a roller $d$ located above the exposure-aperture adjacent to and detachably geared to the blind-roller above the exposure-aperture, a spring in the said top blind-roller of less power than the spring in the aforesaid spring-actuated lower roller so that the latter when released will overcome the spring top roller and tapes or flexible connections $x$ attached to said roller $d$ and to the blind parts substantially as and for the purposes hereinbefore described with reference to the drawings hereunto annexed.

In witness whereof I have hereunto set my hand in presence of two witnesses.

ARTHUR LEWIS ADAMS.

Witnesses:
HENRY BIRKBECK,
R. WESTACOTT.